(12) United States Patent
Fukuda et al.

(10) Patent No.: US 10,889,003 B2
(45) Date of Patent: Jan. 12, 2021

(54) ROBOT SYSTEM, ROBOT CONTROLLER, AND METHOD FOR CONTROLLING ROBOT

(71) Applicant: KABUSHIKI KAISHA YASKAWA DENKI, Kitakyushu (JP)

(72) Inventors: Takuya Fukuda, Kitakyushu (JP); Yukio Hashiguchi, Kitakyushu (JP); Noriko Abe, Kitakyushu (JP)

(73) Assignee: KABUSHIKI KAISHA YASKAWA DENKI, Kitakyushu (JP)

( * ) Notice: Subject to any disclaimer, the term of this patent is extended or adjusted under 35 U.S.C. 154(b) by 217 days.

(21) Appl. No.: 15/899,604

(22) Filed: Feb. 20, 2018

(65) Prior Publication Data

US 2018/0236669 A1 Aug. 23, 2018

(30) Foreign Application Priority Data

Feb. 20, 2017 (JP) .................. 2017-029387

(51) Int. Cl.
*B25J 13/08* (2006.01)
*B25J 19/02* (2006.01)
(Continued)

(52) U.S. Cl.
CPC .............. *B25J 13/089* (2013.01); *B25J 9/10* (2013.01); *B25J 9/1692* (2013.01); *B25J 9/1697* (2013.01); *B25J 19/023* (2013.01); *G05B 19/402* (2013.01); *G06T 1/0014* (2013.01); *G06T 7/74* (2017.01); *H04N 19/139* (2014.11); *G05B 2219/39016* (2013.01); *G05B 2219/39024* (2013.01); *G05B 2219/39029* (2013.01);
(Continued)

(58) Field of Classification Search
None
See application file for complete search history.

(56) References Cited

U.S. PATENT DOCUMENTS 4,750,104 A * 6/1988 Kumamoto .......... G05B 19/232
318/603
5,005,135 A * 4/1991 Morser ................ G05B 19/373
318/571
(Continued)

FOREIGN PATENT DOCUMENTS

DE 60 2005 003 147 T2 8/2008
DE 60 2004 013 107 T2 7/2009
(Continued)

OTHER PUBLICATIONS

German Office Action dated May 19, 2020 in Patent Application No. 10 2018 202 322.0 (with English translation), 10 pages.
(Continued)

*Primary Examiner* — Bhavesh V Amin
(74) *Attorney, Agent, or Firm* — Oblon, McClelland, Maier & Neustadt, L.L.P.

(57) ABSTRACT

A robot system includes a robot, a robot work environment in which the robot works, and a robot controller including circuitry that stores position information indicating a position of each of measured robot postures in the robot work environment, obtains a measured position of each of the measured robot postures based on a detection result obtained by a sensor, and corrects a movement position of the robot based on the measured position.

20 Claims, 8 Drawing Sheets

(51) Int. Cl.
  *G05B 19/402* (2006.01)
  *G06T 7/73* (2017.01)
  *H04N 19/139* (2014.01)
  *B25J 9/10* (2006.01)
  *B25J 9/16* (2006.01)
  *G06T 1/00* (2006.01)

(52) U.S. Cl.
  CPC .............. *G05B 2219/39045* (2013.01); *G05B 2219/40584* (2013.01); *G06T 2207/30204* (2013.01)

(56) References Cited

U.S. PATENT DOCUMENTS

| | | | | |
|---|---|---|---|---|
| 5,237,509 A * | 8/1993 | Ueta | G05B 19/402 | 318/632 |
| 5,581,467 A * | 12/1996 | Yasuda | G05B 19/404 | 700/193 |
| 5,740,081 A * | 4/1998 | Suzuki | G05B 19/4015 | 700/159 |
| 6,167,325 A * | 12/2000 | Kamiguchi | G05B 19/4103 | 700/183 |
| 6,292,715 B1 * | 9/2001 | Rongo | B25J 9/1664 | 318/568.1 |
| 6,293,750 B1 * | 9/2001 | Cohen | G01N 35/0099 | 414/744.4 |
| 6,332,636 B1 * | 12/2001 | Cohen | G01N 35/0099 | 294/119.1 |
| 6,374,982 B1 * | 4/2002 | Cohen | G01N 35/0099 | 198/346.2 |
| 6,836,702 B1 * | 12/2004 | Brogårdh | B23K 26/04 | 318/568.1 |
| 6,982,731 B2 * | 1/2006 | Hall | G05B 19/40935 | 345/689 |
| 7,155,298 B2 * | 12/2006 | Rutkowski | G05B 19/40938 | 700/87 |
| 7,376,488 B2 * | 5/2008 | Watanabe | B25J 9/1664 | 700/257 |
| 7,643,905 B2 * | 1/2010 | Watanabe | B25J 9/1656 | 700/253 |
| 7,853,351 B2 * | 12/2010 | Corey | G05B 19/40937 | 700/193 |
| 8,886,359 B2 * | 11/2014 | Inaba | B25J 9/163 | 700/253 |
| 9,043,024 B2 * | 5/2015 | Chiu | B25J 9/1692 | 700/254 |
| 9,050,728 B2 * | 6/2015 | Ban | B25J 9/1692 | |
| 9,211,647 B2 * | 12/2015 | Nagayama | B25J 9/1623 | |
| 9,383,741 B2 * | 7/2016 | Nakamura | B25J 5/007 | |
| 9,498,231 B2 * | 11/2016 | Haider | A61B 34/37 | |
| 9,517,563 B2 * | 12/2016 | Watanabe | B25J 9/1607 | |
| 9,731,419 B2 * | 8/2017 | Halsmer | B25J 9/1656 | |
| 9,751,211 B1 * | 9/2017 | Saunders | B25J 9/1602 | |
| 9,757,859 B1 * | 9/2017 | Kolb | G01S 13/862 | |
| 9,774,827 B2 * | 9/2017 | Tanaka | B25J 9/1689 | |
| 9,782,896 B2 * | 10/2017 | Terada | B25J 9/162 | |
| 9,815,198 B2 * | 11/2017 | Davis | G05B 19/4083 | |
| 10,016,892 B2 * | 7/2018 | Davis | G05B 19/4015 | |
| 10,059,003 B1 * | 8/2018 | Linnell | B25J 9/1697 | |
| 10,105,149 B2 * | 10/2018 | Haider | A61B 34/20 | |
| 10,160,116 B2 * | 12/2018 | Li | B25J 9/1692 | |
| 10,219,811 B2 * | 3/2019 | Haider | A61B 17/1703 | |
| 10,286,557 B2 * | 5/2019 | Ando | B25J 9/1697 | |
| 10,421,189 B2 * | 9/2019 | Wallack | B25J 9/1607 | |
| 2003/0200042 A1 * | 10/2003 | Gan | B25J 9/1692 | 702/105 |
| 2005/0107918 A1 * | 5/2005 | Watanabe | B25J 9/1684 | 700/245 |
| 2005/0107920 A1 * | 5/2005 | Ban | G05B 19/4083 | 700/245 |
| 2010/0161125 A1 * | 6/2010 | Aoba | G06T 1/00 | 700/254 |
| 2011/0270444 A1 * | 11/2011 | Nagata | B25J 9/1633 | 700/258 |
| 2013/0019697 A1 * | 1/2013 | McKeen | G01N 35/10 | 73/863.21 |
| 2017/0370956 A1 * | 12/2017 | Hurwitz | C12M 1/34 | |
| 2018/0093380 A1 * | 4/2018 | Yoshida | B25J 13/088 | |
| 2019/0195904 A1 * | 6/2019 | Matthias | G01N 35/00029 | |

FOREIGN PATENT DOCUMENTS

| | | |
|---|---|---|
| DE | 10 2010 032 840 A1 | 2/2011 |
| EP | 1 525 953 A2 | 4/2005 |
| EP | 1 953 496 A2 | 8/2008 |
| EP | 1 875 991 B1 | 3/2014 |
| JP | 2007-115011 A | 5/2007 |
| JP | 2012-240174 A | 12/2012 |
| JP | 2017-024130 A | 2/2017 |

OTHER PUBLICATIONS

Office Action dated Oct. 21, 2020 in Japanese Patent Application No. 2017-029387 (with English Translation).

* cited by examiner

ROBOT SYSTEM, ROBOT CONTROLLER, AND METHOD FOR CONTROLLING ROBOT

CROSS-REFERENCE TO RELATED APPLICATIONS

The present application claims priority under 35 U.S.C. § 119 to Japanese Patent Application No. 2017-029387, filed Feb. 20, 2017. The contents of this application are incorporated herein by reference in their entirety.

BACKGROUND

Field of the Invention

The embodiments disclosed herein relate to a robot system, a robot controller, and a method for controlling a robot.

Discussion of the Background

JP2012-240174A discloses how to make a correction, based on a measured position of one marker, between an entirety of a robot coordinate system and an entirety of a sensor coordinate system.

SUMMARY

According to one aspect of the present invention, a robot system includes a robot, a robot work environment in which the robot works, and a robot controller including circuitry that stores position information indicating a position of each of measured robot postures in the robot work environment, obtains a measured position of each of the measured robot postures based on a detection result obtained by a sensor, and corrects a movement position of the robot based on the measured position.

According to another aspect of the present disclosure, a robot controller includes a user frame storage that stores work origins in a robot work environment in which a robot works, and circuitry that obtains a measured position of each of the work origins based on a detection result obtained by a sensor, and corrects, based on the measured position, a position information of each of the work origins stored in the user frame storage.

According to the other aspect of the present disclosure, a method for controlling a robot includes storing position information indicating, for a robot controller, a position of each of measured robot postures in a robot work environment in which a robot works, obtaining a measured position of each of the measured robot postures based on a detection result obtained by a sensor, and correcting the position information of each of the measured robot postures based on the measured position.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
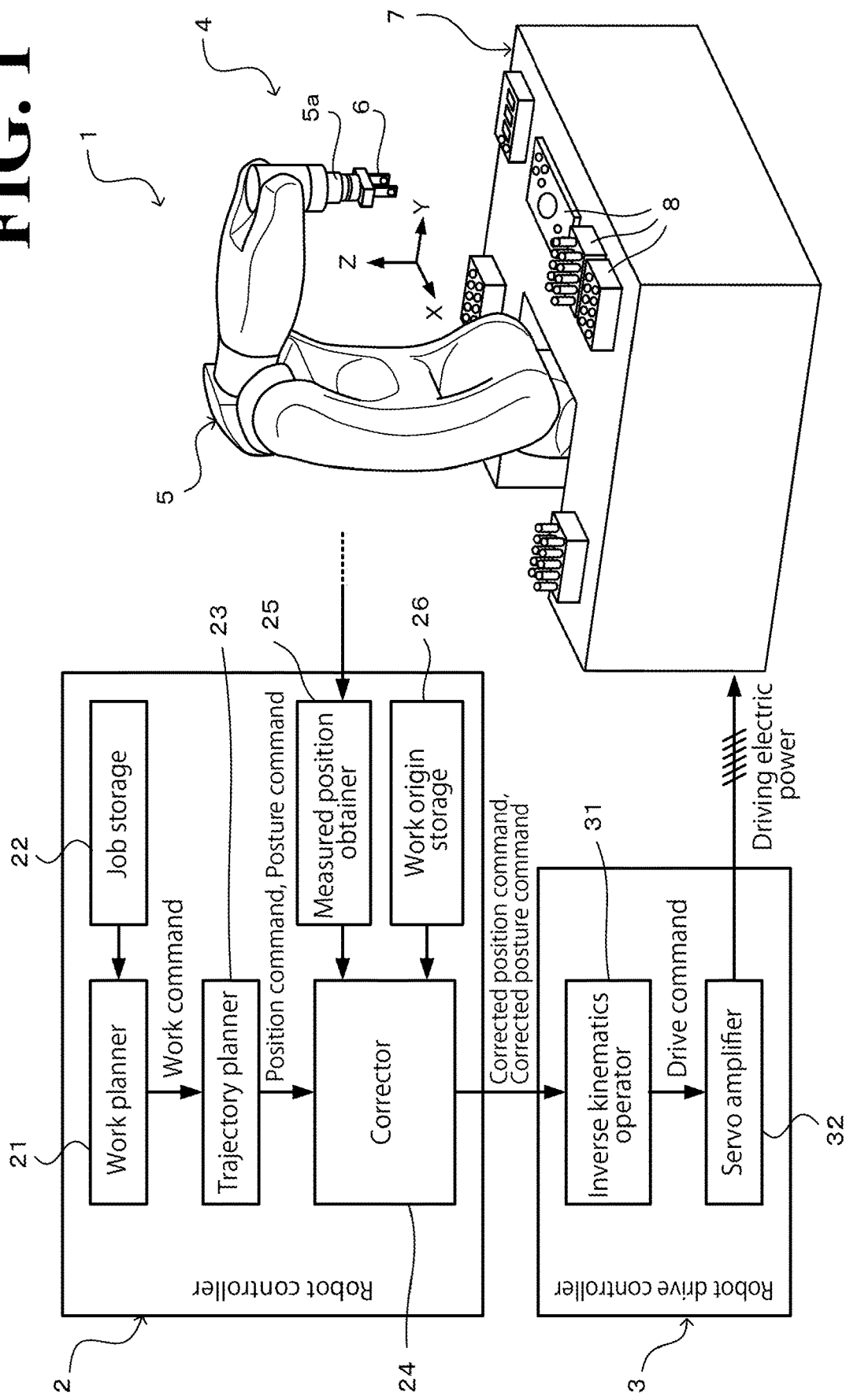
FIG. 1 is a diagram illustrating an exemplary system block configuration of a robot system according to an embodiment.

The embodiments will now be described with reference to the accompanying drawings, wherein like reference numerals designate corresponding or identical elements throughout the various drawings.

Schematic Configuration of Robot System

FIG. 1 is a diagram illustrating an exemplary system block configuration of a robot system 1 according to this embodiment. As illustrated in FIG. 1, the robot system 1 includes a robot controller 2, a robot drive controller 3, and a robot cell 4. The robot cell 4 performs experiments in the biomedical fields. While in this embodiment the robot cell 4 is controlled to perform experiments in the biomedical fields, it is also possible to control robot cells to perform operations in any other industrial fields, such as piece-part assembly operations.

The robot controller 2 outputs a corrected position command to the robot drive controller 3. the corrected position command specifies movements of a work robot 5 to perform work steps of a predetermined experiment sequence. The robot controller 2 includes a work planner 21, a job storage 22 (which is a non-limiting example of the movement program storage recited in the appended claims), a trajectory planner 23, a corrector 24, a measured position obtainer 25, and a work origin storage 26.

In order to cause the work steps, which are large in number, to be performed on a time-series basis, the work planner 21 obtains from the job storage 22 a next job to be performed by the work robot 5. The job is a numerical-control movement command program specifying movement details. Then, the work planner 21 generates a work command based on the job and outputs the work command to the trajectory planner 23. Specifically, the work command specifies a next end point to which a reference position of an end effector 6 is next to move in a work space coordinate system XYZ, which is set based on the work robot 5 as a reference. The work command also specifies an end point posture that the end effector 6 takes at the end point. The work planner 21 also outputs a movement command for the end effector 6 (this movement command is not illustrated in FIG. 1).

The trajectory planner 23, based on the work command input from the work planner 21, outputs to the corrector 24 a position command specifying a suitable stopover and a posture command specifying a suitable posture at the stopover. The position command and the posture command are for causing the end effector 6 to move to the end point and take an end point posture while avoiding interferential contact between the work robot 5 and work target instruments, described later.

The work origin storage 26 stores a plurality of work origins, and the measured position obtainer 25 obtains measured positions of the respective work origins. Based on coordinate positions (which are designed positions, described later) of the work origins and based on the measured positions, the corrector 24 corrects the position command and the posture command input from the trajectory planner 23, and outputs the corrected position command and the corrected posture command. The work origin storage 26 is a non-limiting example of the user frame storage recited in the appended claims.

It will be understood by those skilled in the art that the processings performed by the above-described elements such as the work planner 21, the job storage 22, the trajectory planner 23, the corrector 24, the measured position obtainer 25, and the work origin storage 26 may be performed by a smaller number of processing elements (for example, a single processing element) or by a larger number of processing elements. It will also be understood by those skilled in the art that the robot controller 2 may be implemented by programs executed by a CPU 901 (described later by referring to FIG. 8) or may be partially or entirely implemented by a tangible device or tangible devices such as an application specific integrated circuit (ASIC), a field-programmable gate array (FPGA), and other electric circuit.

Based on the corrected position command and the corrected posture command input from the robot controller 2, the robot drive controller 3 outputs driving electric power to drive-control the work robot 5. The robot drive controller 3 includes an inverse kinematics operator 31 and a servo amplifier 32.

The inverse kinematics operator 31 calculates, based on the current position and posture of the end effector 6, target rotational angles by which drive shaft motors (not illustrated) of the work robot 5 need to rotate in order to control the end effector 6 to move to the position indicated by the corrected position command input from the corrector 24 and take the posture indicated by the corrected posture command input from the corrector 24. Then, the inverse kinematics operator 31 outputs a drive command(s) indicating the target rotational angles.

Based on the drive command input from the inverse kinematics operator 31, the servo amplifier 32 performs control of feeding driving electric power to drive-control the drive shaft motors of the work robot 5 and the end effector 6.

The robot cell 4 is a machine and/or an apparatus that actually performs experiments, and includes the work robot 5 and a work table 7.

The work robot 5 according to this embodiment is a manipulator arm with six joint axes connected in series to each other (six-axis multi-articular robot). The end effector 6, which is a gripper in this embodiment, is mounted on a leading arm end 5a of the work robot 5 to perform holding operation. In order to perform the holding operation, the end effector 6 undergoes position control and posture control within the work space coordinate system XYZ, which is set based on the work robot 5.

The work table 7 surrounds the work robot 5 with a plurality of work target instruments 8 disposed on the upper surface of the work table 7 in a predetermined pattern. The work target instruments 8 are to be worked on by the work robot 5. Examples of the work target instruments 8 include, but are not limited to, containers for holding laboratory instruments such as test tubes and pipettes; and devices for providing heating, vibration, and other treatment with respect to the laboratory instruments. Any of these examples are disposed within a workable range, where the end effector 6 is able to position the examples while taking predetermined postures. The work table 7 is a non-limiting example of the robot work environment recited in the appended claims.

Features of this Embodiment

Robot cells that integrate the robot work environment with the work robot have recently been developed. In the robot work environment, a set of work instruments, such as the above-described biomedical laboratory instruments, are disposed along with associated instruments in a predetermined pattern. The work robot 5 performs operations using the work instruments. Among such robot cells, those robot cells used for experiments in the biomedical fields need to repeat particular additional experiments with high reproductivity. This requires a high level of control accuracy such as in the positioning of the work robot 5 relative to the robot work environment.

Even if, however, a plurality of robot cells identically designed in every detail are produced, there are small mechanical errors (instrumental errors) inherent between the individual robot cells. Specifically, there are manufacturing errors between the parts of the robot cells; assembly errors between the robot cells, including installment errors between the work robots and the work instruments; and position errors between the robot cells caused by different application environments such as environment temperature. Because of the mechanical errors, even if an operation control program (numerical control program; job) specifying operations is executed in identically designed robot cells, it is difficult to make the level of likeness of the resulting operations the high control accuracy level required in the above-described experiments. In light of the circumstances, conventional practice was to correct the mechanical errors of the individual robot cells by teaching work that depended on the level of skillfulness of an engineer. This has made the robot cells less useful.

In light of the circumstances, the robot system 1 according to this embodiment includes the work origin storage 26, the measured position obtainer 25, and the corrector 24. The work origin storage 26 stores a plurality of work origins disposed in the robot work environment. The measured position obtainer 25 obtains a measured position of each of the plurality of work origins based on a detection result obtained by a camera, described later. The corrector 24 corrects, based on the measured position, position information of each of the plurality of work origins stored in the work origin storage 26. Thus, a plurality of work origins are set in the robot work environment, and the position of each of the plurality of work origins is corrected based on the measured position of each of the plurality of work origins. This configuration ensures the high control accuracy level required in the above-described experiments at least for relative operations performed between or among position-corrected work origins. The correction operation performed by the corrector 24 will be described in detail below.

Correction of Position of Work Origin

Figure 2:
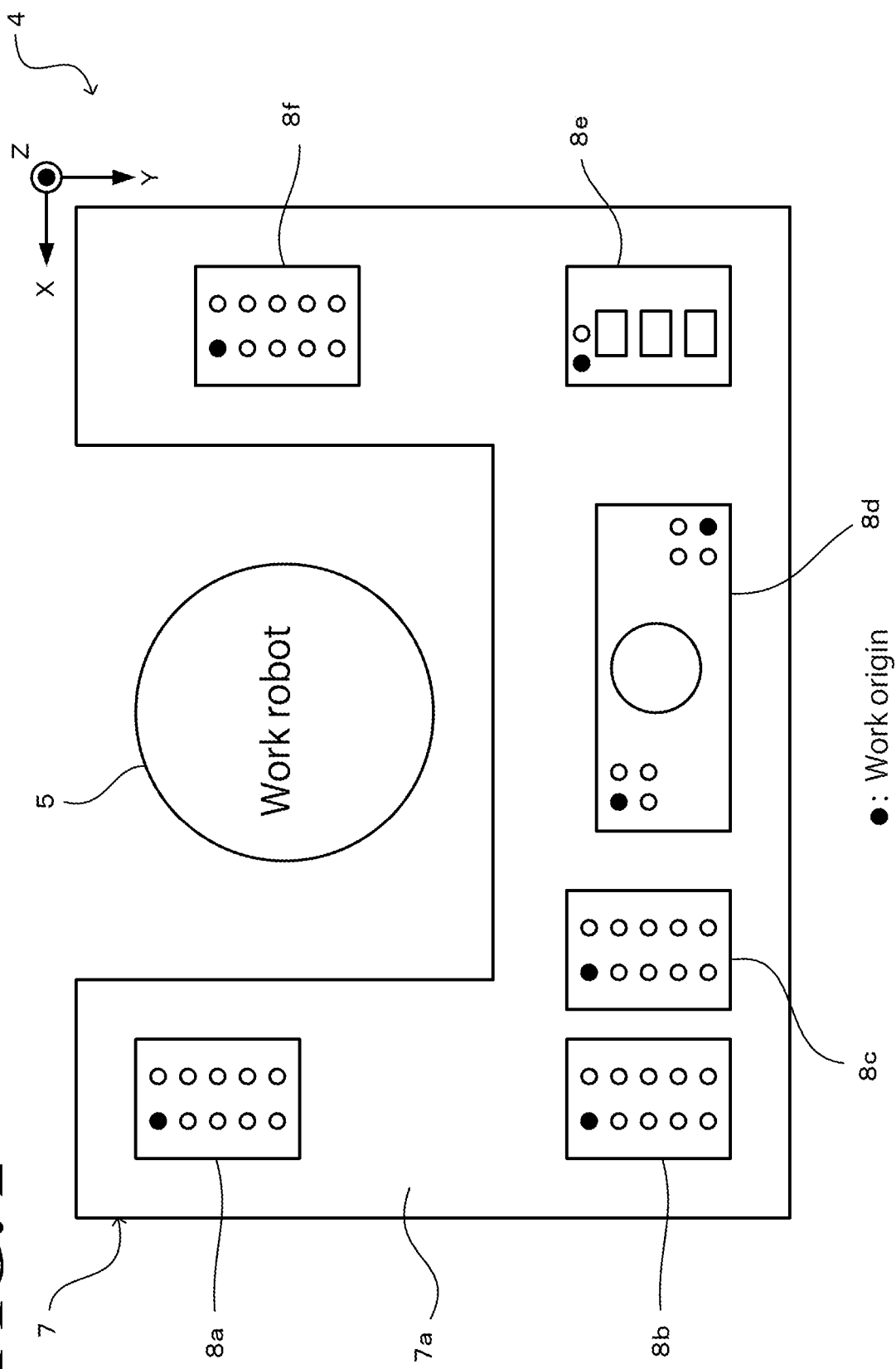
FIG. 2 is a top view of a robot cell illustrating an exemplary position of a work robot relative to a work table.
Figure 3:
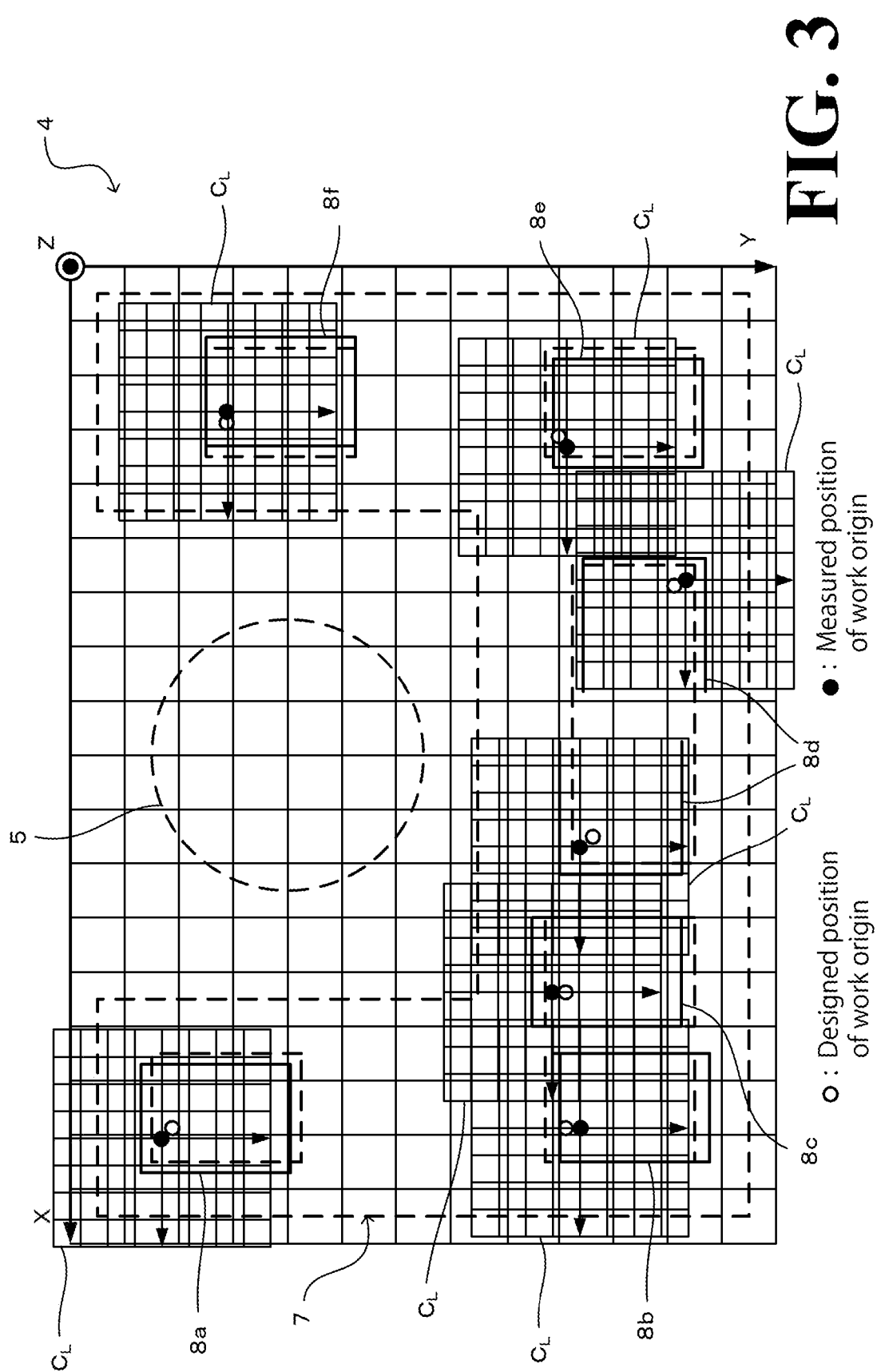
FIG. 3 illustrates exemplary measured positions of the work origins illustrated in FIG. 2 and exemplary local coordinate systems corresponding to the respective measured positions.

FIGS. 2 and 3 are top views of the work table 7 and the work robot 5 of the robot cell 4. To avoid complicated illustration, the work robot 5 is illustrated in simplified, circular form. As illustrated in FIG. 2, a plurality of (six in the embodiment illustrated in FIG. 2) different work target instruments 8a to 8f are disposed in a predetermined pattern on a platform 7a of the work table 7 (the work target instruments 8a to 8f may occasionally be referred to as work target instruments 8 collectively). An imaginary work space coordinate system XYZ is set based on mechanical position and posture of the work robot 5. The work robot 5 operates based on a position command and a posture command that are based on the work space coordinate system XYZ. The platform 7a and the work target instruments 8 are designed and produced to be disposed at predetermined positions in the work space coordinate system XYZ with predetermined postures.

An exemplary operation performed by the work robot 5 is a transfer operation between the work target instruments 8, taking a test tube out of a container and setting the test tube in a heating device located at a different position. This operation depends on the take-out position relative to the setting position. However, even if robot cells are identically designed in every detail, the above-described various mechanical errors (instrumental errors) and accidental errors occur and accumulate, making small errors between relative positions of the different work target instruments 8 inevitable.

In view of the circumstances, in this embodiment, a work origin is set in advance for each of the work target instruments 8 based on a corresponding designed position in the work space coordinate system XYZ, and the designed positions of the respective work origins are stored in the work origin storage 26 (see black points in FIG. 2). Also in this embodiment, the measured position obtainer 25 physically measures the work origins in the work space coordinate system XYZ by image recognition using a camera, described later, and obtains measured positions of the respective work origins. The designed positions (see white points in FIG. 3) of the respective work origins stored in the work origin storage 26 are compared with the measured positions (see black points in FIG. 3) of the respective designed positions. In this manner, the position of each of the work origins is corrected. This configuration ensures the high control accuracy level required in the above-described experiments at least for relative operations performed between or among position-corrected work origins.

There is a kind of work performed within a single work target instrument 8. A non-limiting example of the work is to transfer a test tube from one position to another position within a single container. In such work, position-to-position dimensional errors between or among the work target instruments 8, if any, are assumed to be negligibly small, and under this assumption, a local coordinate system $C_L$ is set for each of the work target instruments 8 based on the work origin of the work target instrument 8. Then, the work is performed within the local coordinate system $C_L$. Specifically, the job stored in the job storage 22 (that is, numerical-control movement command program performed by the work planner 21) is described along with a designed position of the work origin on the local coordinate system $C_L$ (that is, relative position information indicating a relative position relative to the work origin is included in the job). Thus, the relative position information defines a job of the work robot 5 within a work target instrument 8 with the work origin doubling as the local origin. This configuration eliminates or minimizes the influence of errors relative to other work origins and improves the control accuracy in a single work target instrument 8. When a work target instrument 8 has greater than a predetermined size, such as a work target instrument 8d, a plurality of work origins each provided with a local coordinate system $C_L$ may be set in the work target instrument 8d. In this case, the plurality of work origins may be spaced apart from each other by equal to or more than a predetermined distance. A reason for this configuration will be detailed later.

Thus, in this embodiment, a local coordinate system $C_L$ is set for each of the work origins in the work space coordinate system XYZ, instead of using the only one reference point for the work space coordinate system XYZ as a whole. This configuration ensures the high control accuracy level required in the above-described experiments at least for relative operations performed between or among position-corrected local coordinate systems $C_L$, that is, relative operations performed between or among the work target instruments 8.

Physical Measurement of Work Origin

Figure 4:
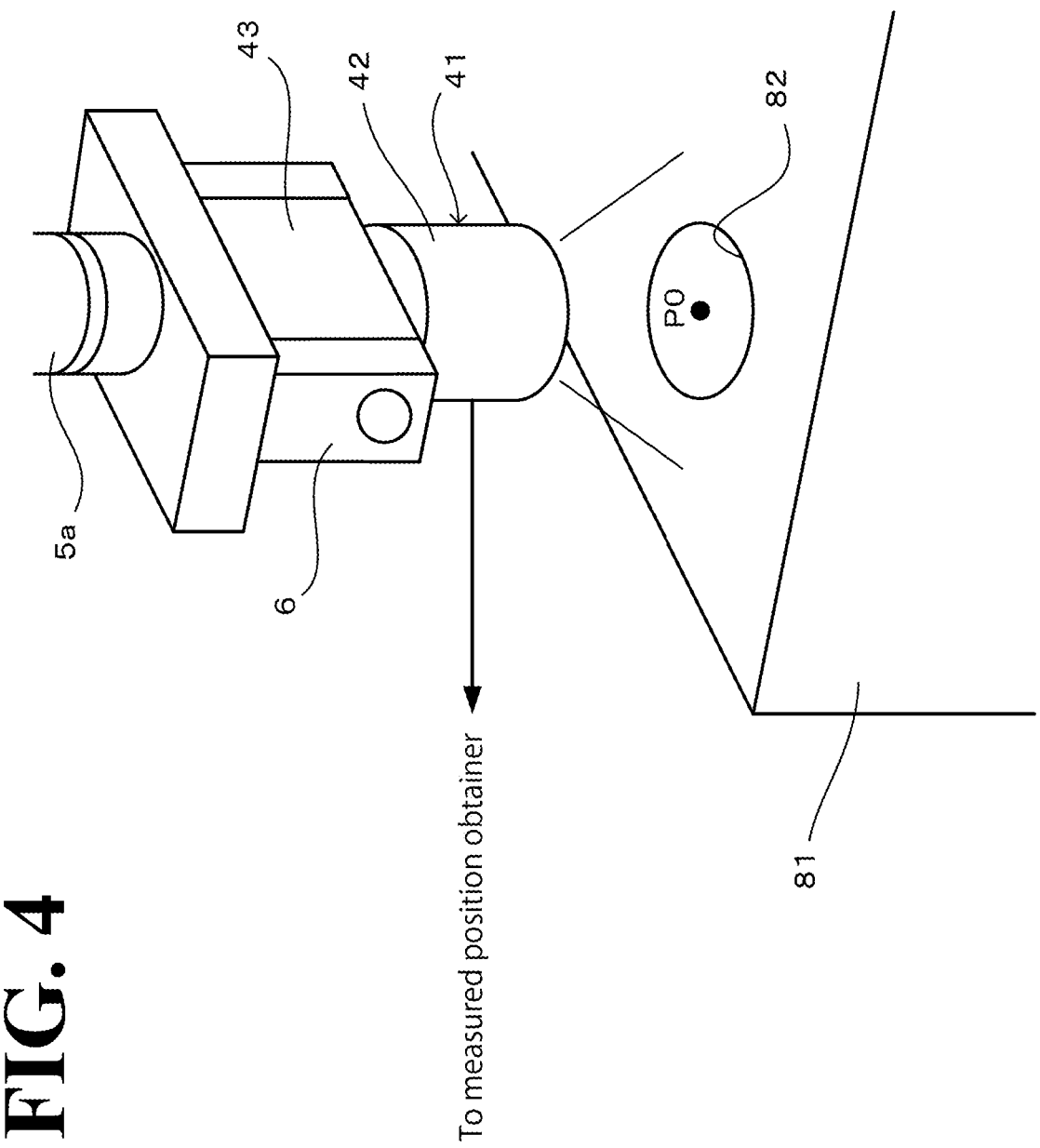
FIG. 4 is a perspective view of a camera picking up an image of a work origin so as to physically measure the work origin.

FIG. 4 is a perspective view of a camera picking up an image of a work origin so as to physically measure the work origin. As described above, in this embodiment, a camera 41 is mounted on the end effector 6 of the work robot 5. The camera 41 is caused to move and pick up an image of a portion corresponding to the work origin. The image is then subjected to image recognition at the measured position obtainer 25. In this manner, the measured position of the work origin is physically measured.

In the embodiment of FIG. 4, the work target instrument 8 is a tube rack 81. The tube rack 81 is capable of receiving a tube (which is a laboratory instrument, not illustrated) inserted into an insertion hole 82 of the tube rack 81 from above. The work origin of the work target instrument 8 (the tube rack 81) is set approximately at the center of the opening of the insertion hole 82. The camera 41 includes an imaging device 42 and a camera body 43. The imaging device 42 has a cylindrical shape fittable in the insertion hole 82 (that is, the cylindrical shape has approximately the same diameter as the diameter of the tube). The camera body 43 has a rectangular shape fixed to an upper portion of the imaging device 42. The camera body 43 with a predetermined posture is held by the end effector 6, which is a gripper in this embodiment, at a predetermined position with the camera 41 and the end effector 6 having such an arrangement relationship that the imaging direction of the camera 41 fixed in this manner passes through a reference position (not illustrated) of the end effector 6 (or the leading arm end 5a) in a predetermined direction.

Figure 5:
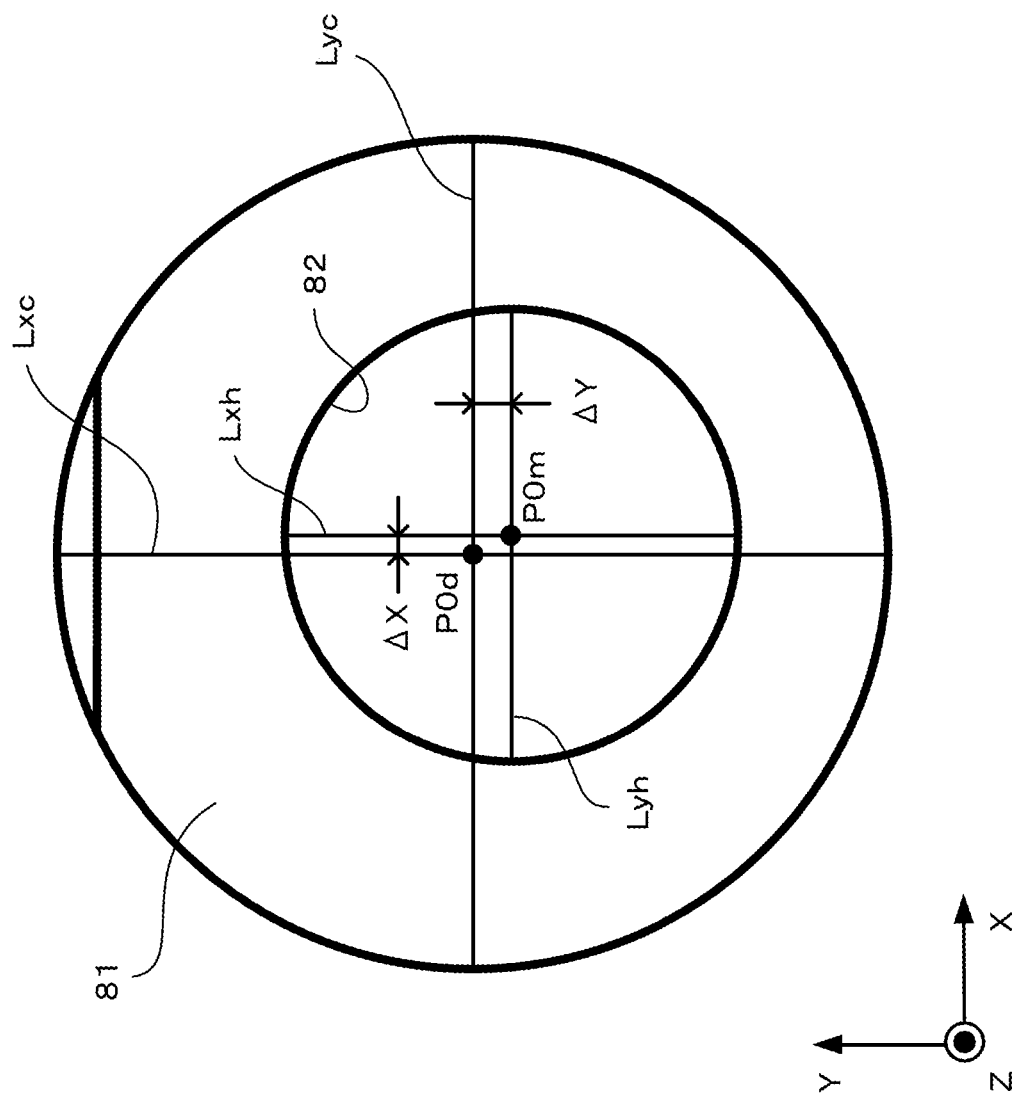
FIG. 5 illustrates an exemplary image picked up by the camera at a designed position of the work origin.

With the imaging direction of the camera 41 downward, the work robot 5 obtains, from the work origin storage 26, the work origin (designed position at the center of the insertion hole 82) of the work target instrument 81, and moves the camera 41 to make the imaging direction match the work origin in horizontal directions (the X-Y directions in FIG. 5). With the imaging direction and the work origin in matching state, the camera 41 picks up an image as illustrated in FIG. 5. Referring to FIG. 5, the picked-up image is a circular image with its maximum diameter equivalent to the inner diameter of the cylindrical imaging device 42. In the picked-up image, fixed diameter standard lines Lxc and Lyc, which are orthogonal to each other, are set in advance, with the node (the center point of the circular picked-up image) of the diameter standard lines Lxc and Lyc matching a designed position d of the work origin P0d.

Upon receipt of the picked-up image, the measured position obtainer 25 performs image recognition with respect to a circular image portion of the insertion hole 82 imaged in the picked-up image so as to draw on the insertion hole 82 two diameter standard lines Lxh and Lyh, which are orthogonal to each other. The node of the diameter standard lines Lxh and Lyh in the circular image portion of the insertion hole 82 is the physically measured point of the work origin that corresponds to the measured position, P0m, of the work origin. In the embodiment illustrated in FIG. 5, the diameter standard line Lxc in the circular picked-up image is parallel to the diameter standard line Lxh on the insertion hole 82 in the X direction of the work space coordinate system XYZ, and the diameter standard line Lyc is parallel to the diameter standard line Lyh in the Y direction of the work space coordinate system XYZ. There is an error of ΔX in the X direction between the diameter standard lines Lxc and Lxh, and there is an error of ΔY in the Y direction between diameter standard lines Lyc and Lyh. The errors ΔX and ΔY correspond to position errors of the measured position P0m of the work origin relative to the designed position P0d of the work origin. The measured position obtainer 25 obtains the measured position P0m based on the errors ΔX and ΔY. The camera 41 is a non-limiting example of the sensor recited in the appended claims.

Correction Corresponding to Coordinate Distortion of Local Coordinate System

The work robot 5 according to this embodiment is a multi-articular robot, with a plurality of rotation axes connected in series to each other. In using such work robot, a small coordinate distortion inevitably occurs in the local coordinate system $C_L$ around the work origin when the arms cooperate to make rotational motion. For example, in order to cause the leading arm end 5a to make linear motion in the X axis direction, the trajectory planner 23 performs an arithmetic operation in the local coordinate system $C_L$, but in the real-space coordinate system, the leading arm end 5a moves at an angle relative to the X axis direction. In light of the circumstances, in this embodiment, the corrector 24 corrects the local coordinate system $C_L$ of each of the work origins based on the above-described coordinate distortion characteristic, and thus sets a corrected coordinate system $C_R$.

Figure 6:
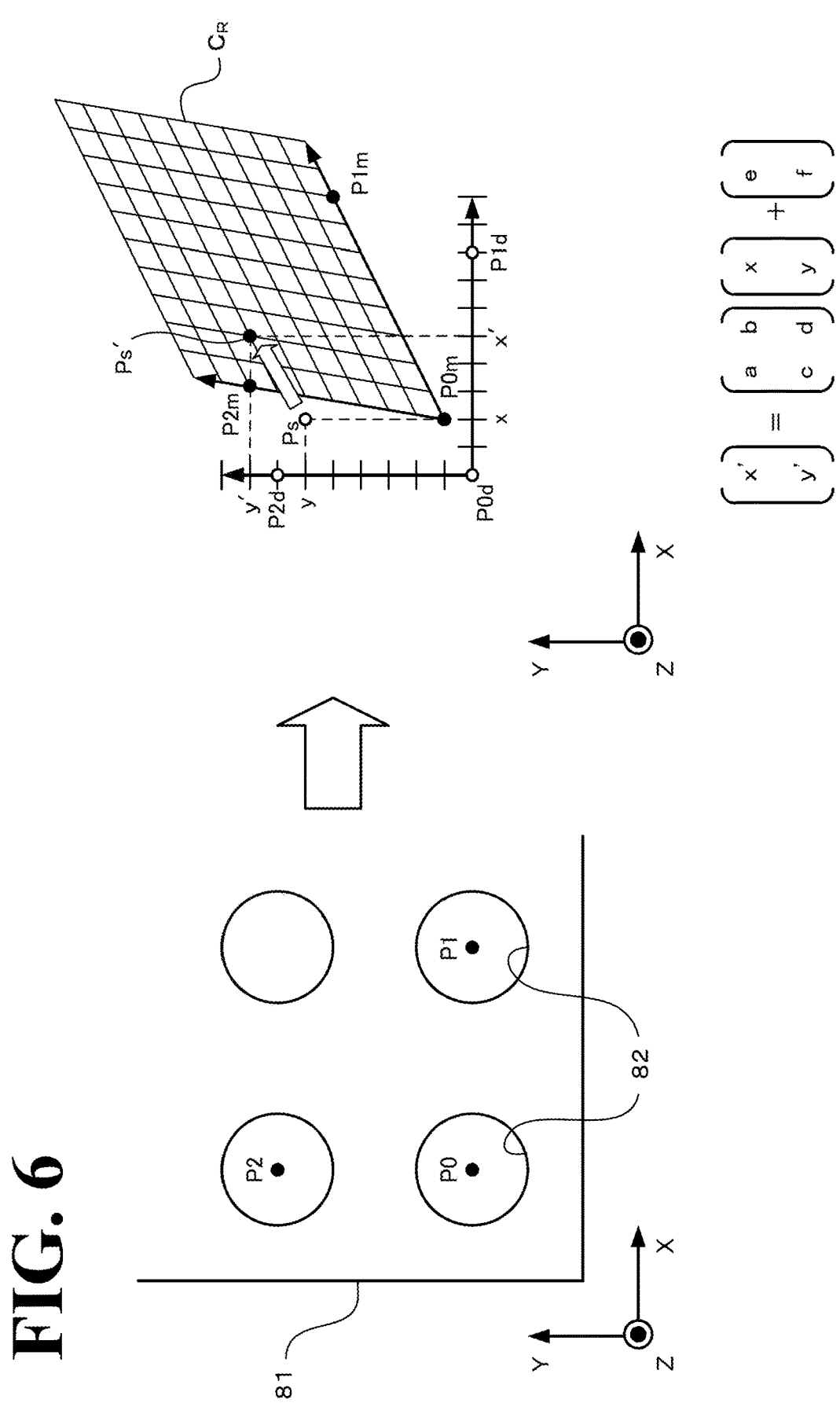
FIG. 6 illustrates how to correct a coordinate distortion of a local coordinate system.

FIG. 6 illustrates how to correct a coordinate distortion of the local coordinate system $C_L$. The left half of FIG. 6 illustrates an actual arrangement of the insertion holes 82 of the tube rack 81, which is an exemplary work target instrument 8. The right half of FIG. 6 illustrates an imaginary local coordinate system $C_L$ corresponding to the arrangement and an imaginary corrected coordinate system $C_R$, which takes a coordinate distortion into consideration. In the example illustrated in the left half of FIG. 6, a work origin P0 is set approximately at the center of the left lower insertion hole 82 of the tube rack 81. Also, a reference point P1 is set approximately at the center of the insertion hole 82 next to the left lower insertion hole 82 in the X axis direction, and a reference point P2 is set approximately at the center of the insertion hole 82 next to the left lower insertion hole 82 in the Y axis direction. Each of the two reference points P1 and P2 is assigned a designed position on the local coordinate system $C_L$ in relation to the work origin P0, and the work origin storage 26 stores in advance the designed positions of the reference points P1 and P2. Similarly to the measured positions of the work origin P0, measured positions of the reference points P1 and P2 can be obtained by the above-described method of physical measurement.

Physically measuring the work origin P0 and the two reference points P1 and P2 respectively results in measured positions P0m, P1m, and P2m. As illustrated in the right half of FIG. 6, the measured positions P0m, P1m, and P2m are respectively displaced from designed positions P0d, P1d, and P2d, because of mechanical errors. Additionally, the above-described coordinate distortion characteristics inherent in multi-articular robots makes the arrangement relationship among the measured positions P0m, P1m, and P2m different from the arrangement relationship among the designed positions P0d, P1d, and P2d (which is orthogonal relationship with the node at the work origin P0, as illustrated in FIG. 6).

In this respect, the above-described coordinate distortion of the local coordinate system $C_L$ caused by the multi-articular nature of the work robot 5 is known to be analogous to a shear (skew) transformation. In light of this, the shear transformation may be combined with a translation used for the position correction of the work origin P0, resulting in an "affine transformation". The local coordinate system $C_L$ may be corrected by an affine transformation, and the corrected coordinate system may be set as corrected coordinate system $C_R$.

Specifically, a linear mapping transformation represented by the transformation equation illustrated in the lower half of the right half of FIG. 6 is performed to obtain corrected position vector $(x', y')^T$ of a point Ps' on the corrected coordinate system $C_R$. More specifically, an inner (scalar) product is obtained between designed position vector $(x, y)^T$ of a sample point Ps on the work space coordinate system XYZ and square matrix (a, b, c, d) subjected to a shear transformation, and translation vector $(e, f)^T$ subjected to a translation is added to the inner product. In other words, two equations: $x'=ax+by+e$ and $y'=cx+dy+f$ are solved. It is noted that a, b, c, d, e, and f are "affine coefficients", and x, y, x', and y' are values indicating positions on the work space coordinate system XYZ.

In this embodiment, the corrected position vector $(x', y')^T$ thus calculated indicates a coordinate position that serves as the corrected position command finally output from the corrector 24 for the work space coordinate system XYZ. It will be understood by those skilled in the art that the designed position (relative position information), described in the job, of the point Ps on the local coordinate system $C_L$ may be applied to the corrected coordinate system $C_R$ based on an affine transformation with the translation vector (e, f) eliminated. To avoid complicated illustration, the local coordinate system $C_L$ is not illustrated in the right half of FIG. 6. The local coordinate system $C_L$ that would otherwise appear in the right half of FIG. 6 is an orthogonal coordinate system with the origin being at the designed position P0d of the work origin and with the X axis and the Y axis being respectively parallel to the X axis direction and the Y axis direction of the work space coordinate system XYZ. With the configuration described hereinbefore, the influence of the above-described coordinate distortion characteristics inherent in multi-articular robots is eliminated or minimized, and the operations performed by the work robot 5 in a real-space coordinate system to implement a job are controlled with improved accuracy.

Effective Ranges of Local Coordinate System and Corrected Coordinate System

Figure 7:
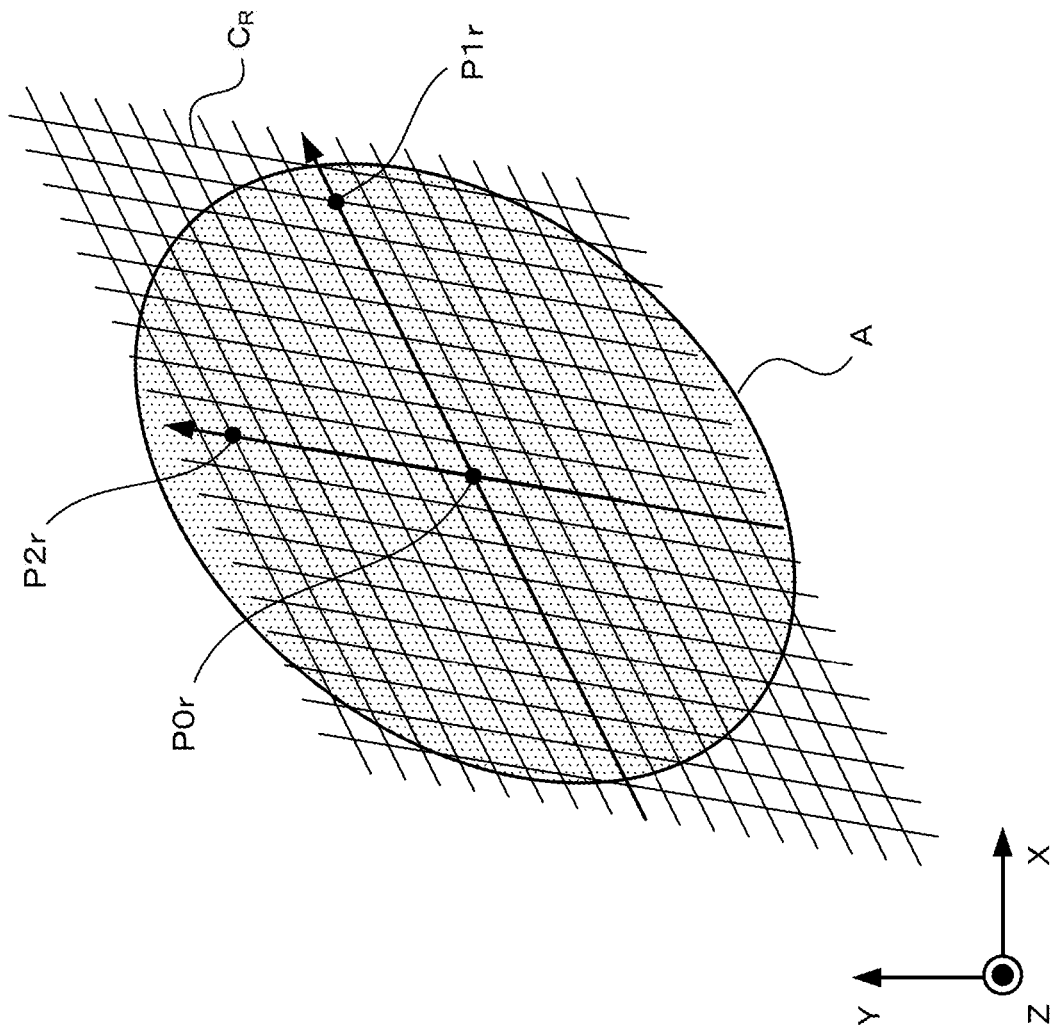
FIG. 7 illustrates an exemplary effective range of a corrected coordinate system.

In using a multi-articular robot such as the work robot 5 according to this embodiment, a small trajectory distortion inevitably occurs in the trajectory of the leading arm end 5a due to the above-described various mechanical errors and coordinate distortion characteristics. For example, in order to cause the leading arm end 5a to make linear motion, the trajectory planner 23 performs an arithmetic operation in the corrected coordinate system $C_R$, but as the leading arm end 5a moves away from the work origin determined as a reference point, the trajectory distortion increases, that is, the leading arm end 5a moves in an overly curved trajectory. In light of the circumstances, in this embodiment, as illustrated in FIG. 7, the relative position information (designed position on the local coordinate system $C_L$) included in a job is limited within a range A. The range A is where a sufficiently high level of control accuracy is secured around the work origin determined as a reference point (the range A is equivalent to a calibration effective range of the work origin). This configuration ensures that the operations performed by the work robot 5 to implement a job are controlled with improved accuracy.

While in FIG. 7 the range A is illustrated in an approximately elliptic shape, the range A may have any other size and shape taking into consideration expected mechanical errors and coordinate distortion characteristics. For a work target instrument 8 large in size enough to exceed the range A, a plurality of work origins are preferably set in a predetermined pattern with a predetermined gap between the work origins so that the work target range of the work target instrument 8 is entirely covered within the range A (see the work target instrument 8d illustrated in FIGS. 2 and 3). The range A is a non-limiting example of the predetermined range around the work origin recited in the appended claims.

Advantageous Effects of this Embodiment

As has been described hereinbefore, the robot system 1 according to this embodiment includes the work origin storage 26, the measured position obtainer 25, and the corrector 24. The work origin storage 26 stores designed positions of a plurality of work origins disposed on the work table 7. The measured position obtainer 25 obtains measured positions of the plurality of work origins based on an image picked up by a camera. The corrector 24 corrects, based on the measured positions, position information of the work origins stored in the work origin storage 26. Thus, a plurality of work origins are set in the work table 7, and the position of each of the plurality of work origins is corrected based on the measured position of each work origin. This configuration ensures a high level of control accuracy at least for relative operations performed between or among position-corrected work origins. This configuration, as a result, makes the robot system 1 more useful.

It will be understood by those skilled in the art that the work origin storage 26 may store designed posture information, as well as the designed positions of the work origins. The designed posture information refers to, for example, information corresponding to the imaging direction of the camera 41 picking up an image to physically measure a work origin, or information corresponding to a direction vector or another quantity indicating an axial direction of the insertion hole 82. In this case, the work origin storage 26 is a non-limiting example of the measured posture storage recited in the appended claims.

In this embodiment, the designed position of a work origin is defined as a three-dimensional position in the work space coordinate system XYZ, which is a three-axis orthogonal coordinate system, and the designed posture of a work origin is defined as a direction vector in the work space coordinate system XYZ. This configuration, however, is not intended in a limiting sense. Another possible example is that the designed position and the designed posture of the work origin are defined in a robot coordinate system that depends on the designed structure of the work robot 5 used in the robot system 1. When the work robot is a six-axis multi-articular robot, such as the work robot 5 according to this embodiment, a predetermined position and a predetermined posture of the end effector 6 (or the leading arm end 5a) can be uniquely determined from a combination of values obtained by the encoders of the six axes (rotation angles) and/or a combination of the positions and postures of the arms. Motion parameters that depend on this designed structure of the work robot 5 may be used as robot coordinates to determine the designed position and the designed posture of the work origin or the measured position and the measure posture of the work origin.

Also in this embodiment, the robot controller 2 includes the job storage 22. The job storage 22 stores jobs of the work robot 5 each including relative position information indicating a position relative to the work origin. Thus, the relative position information (position information indicating a position on the local coordinate system $C_L$) defines a job of the work robot 5 with the work origin doubling as the local origin. This configuration eliminates or minimizes the influence of errors relative to other work origins, resulting in improved control accuracy.

Also in this embodiment, the relative position information included in a job is set within the predetermined range A, which surrounds the work origin. Thus, the relative position information included in a job is limited within the range A. The range A is where a sufficiently high level of control accuracy is secured around the work origin determined as a reference point (the range A is equivalent to the calibration effective range of the work origin). This configuration ensures that the operations performed by the work robot 5 to implement a job are controlled with improved accuracy. This configuration ensures that a job can be shared among robot cells 4, instead of the job being taught to each individual robot cell 4. This enables the robot cells 4 to perform operations with coherent, improved control accuracy.

Also in this embodiment, the corrector 24 sets a plurality of corrected coordinate systems $C_R$, which are based on the plurality of respective work origins, and applies the relative position information included in the job to each of the plurality of corrected coordinate system $C_R$. Thus, the corrector 24 sets a plurality of corrected coordinate systems $C_R$, which are based on the plurality of respective work origins, and applies the relative position information included in the job to each of the corrected coordinate systems $C_R$. This configuration ensures that the operations performed by the work robot 5 in a real-space coordinate system to implement a job are controlled with improved accuracy. This configuration ensures that a job can be shared among robot cells 4, instead of the job being taught to each individual robot cell 4. This enables the robot cells 4 to perform operations with coherent, improved control accuracy.

Also in this embodiment, the work robot 5 is a multi-articular robot, and each of the plurality of corrected coordinate systems $C_R$ is set based on a transformation combination of a shear transformation and a translation. The coordinate distortion of the local coordinate system $C_L$ caused by the multi-articular nature of the work robot 5 is known to be analogous to a shear transformation. In light of this, the shear transformation may be combined with a translation used for the position correction of the work origin, resulting in an "affine transformation", and the corrected coordinate system $C_R$ may be set based on an affine transformation.

Also in this embodiment, the corrected coordinate system $C_R$ is set based on an affine transformation that is based on measured positions, obtained by the measured position obtainer 25, of a single work origin and two reference points around the work origin. This configuration ensures that the corrected coordinate system $C_R$, which is a result of correcting the local coordinate system $C_L$, used in arithmetic operations, can be set more specifically based on the single work origin and the two reference points set in a real-space coordinate system. In this embodiment, the two reference points are orthogonal to each other with the node at the work origin in a real-space coordinate system (that is, the two reference points are disposed at positions translated from the work origin in the X axis direction and the Y axis direction in the real-space coordinate system). This configuration makes the arithmetic operations for the corrected coordinate system $C_R$ simpler and more accurate.

Also in this embodiment, the sensor that physically measures the work origin is a camera movable together with the work robot 5, and the measured position obtainer 25 recognizes an image picked up by the camera so as to obtain the measured position. This configuration ensures that measured positions of the work origin and reference points are obtained without direct contact with the robot work environment, such as the work table 7. Thus, the measured positions are obtained more simply and with a sufficiently high level of accuracy.

Also in this embodiment, the robot system 1 includes, in the work table 7, a plurality of work target instruments 8 to be worked on by the work robot 5, and one work origin is disposed in each of the work target instruments 8, or a plurality of work origins are disposed at predetermined intervals in each of the plurality of work target instruments 8. This configuration improves the control accuracy with which the work robot 5 is controlled to perform an operation with respect to each work target unit, namely, each individual work target instrument 8 disposed in the work table 7.

Also in this embodiment, each of the plurality of the work target instruments 8 includes a tube rack having an insertion hole into which a tube is insertable, and the work origin is set approximately at the center of the insertion hole. Thus, the measured position of the work origin can be obtained by an operation analogous to the fitting of a tube into the tube rack, which is a particular operation that requires a high level of control accuracy. Additionally, it is not necessary to provide an additional work origin; instead, the insertion hole inherent in the work target instrument 8 can be used as a specified position of the work origin. This configuration is particularly compatible with the method of correction according to this embodiment.

A non-limiting example of an application of the method of correction according to this embodiment is a dispensation operation performed by the work robot 5 using a pipette, which is a laboratory instrument, disposed in the work target instrument 8 (this dispensation operation is not illustrated). Dispensation operations using pipettes involved in experiments in such fields as biomedical fields require a particularly high level of control accuracy, and the method of correction according to this embodiment is applicable to such dispensation operations.

Exemplary Hardware Configuration of Robot Controller

By referring to FIG. 8, description will be made with regard to an exemplary hardware configuration of the robot controller 2, which puts into practice the processings implemented by the work planner 21, the job storage 22, the trajectory planner 23, the corrector 24, the measured position obtainer 25, the work origin storage 26, and other software elements implemented by programs executed by the CPU 901.

Figure 8:
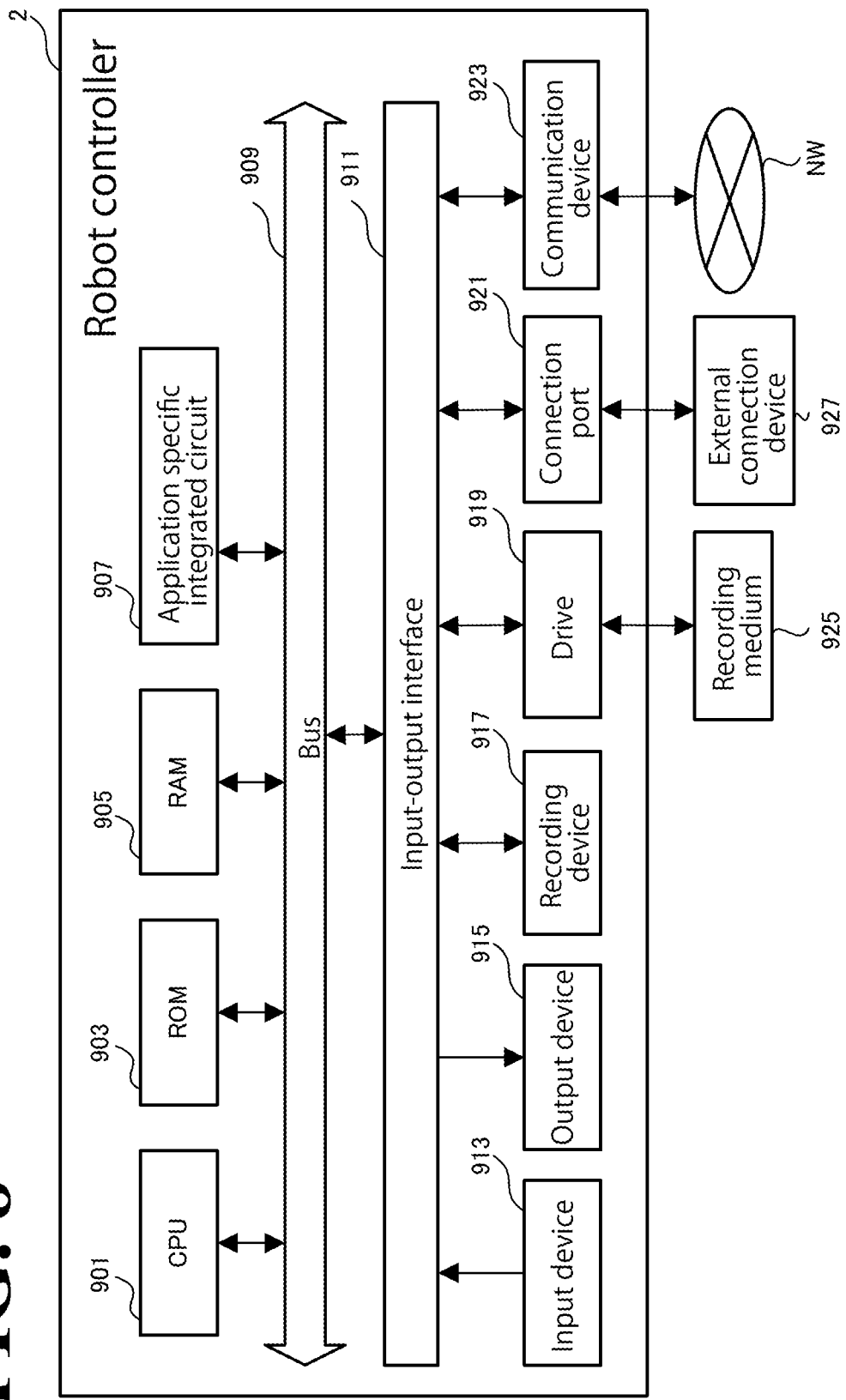
FIG. 8 is a system block diagram of a hardware configuration of a robot controller.

As illustrated in FIG. 8, the robot controller 2 includes the CPU 901, a ROM 903, a RAM 905, an application specific integrated circuit 907, an input device 913, an output device 915, a recording device 917, a drive 919, a connection port 921, and a communication device 923. Examples of the application specific integrated circuit 907 include, but are not limited to, an application specific integrated circuit (ASIC) and a field-programmable gate array (FPGA). These configurations are connected to each other through a bus 909 and an input-output interface 911 so that signals are transmittable to and from the configurations.

The programs may be stored in, for example, the ROM 903, the RAM 905, or the recording device 917.

In another possible embodiment, the programs may be stored in a removable recording medium 925 temporarily or permanently. Examples of the recording medium 925 include, but are not limited to, a magnetic disc such as a flexible disc; an optical disc such as a compact disc (CD), a magneto-optical (MO) disc, and a digital video disc (DVD); and a semiconductor memory. The recording medium 925 may be provided in the form of what is called packaged software. In this case, the programs stored in the recording medium 925 may be read by the drive 919 and stored in the recording device 917 through devices such as the input-output interface 911 and the bus 909.

In another possible embodiment, the programs may be stored in a download site or any other recording device such as a computer (not illustrated). In this case, the programs are transmitted to the communication device 923 through a network NW. Examples of the network NW include, but are not limited to, a local area network (LAN) and the Internet. Then, the programs received by the communication device 923 are stored in the recording device 917 through devices such as the input-output interface 911 and the bus 909.

In another possible embodiment, the programs may be stored in an external connection device 927. In this case, the programs are transmitted through the connection port 921 and stored in the recording device 917 through devices such as the input-output interface 911 and the bus 909.

Then, the CPU 901 performs various processings based on the programs stored in the recording device 917 so as to implement the processings performed at the elements such as the work planner 21, the job storage 22, the trajectory planner 23, the corrector 24, the measured position obtainer 25, and the work origin storage 26. In executing the programs, the CPU 901 may read the programs directly from the recording device 917 or may temporarily load the programs in the RAM 905. When the CPU 901 receives the programs through devices such as the communication device 923, the drive 919, and the connection port 921, the CPU 901 may execute the programs without storing the programs in the recording device 917.

As necessary, the CPU 901 may perform the various processings based on signals or information input through the input device 913, such as a mouse, a keyboard, and a microphone (not illustrated).

Then, the CPU 901 may output results of the processings from the output device 915, such as a display device and a sound output device. As necessary, the CPU 901 may send results of the processings through the communication device 923 and the connection port 921 and store the results of the processings in the recording device 917 and/or the recording medium 925.

As used herein, the terms "perpendicular", "parallel", and "plane" may not necessarily mean "perpendicular", "parallel", and "plane", respectively, in a strict sense. Specifically, the terms "perpendicular", "parallel", and "plane" mean "approximately perpendicular", "approximately parallel", and "approximately plane", respectively, with design-related and production-related tolerance and error taken into consideration.

Also, when the terms "identical", "same", "equivalent", and "different" are used in the context of dimensions, magnitudes, sizes, or positions, these terms may not necessarily mean "identical", "same", "equivalent", and "different", respectively, in a strict sense. Specifically, the terms "identical", "same", "equivalent", and "different" mean "approximately identical", "approximately same", "approximately equivalent", and "approximately different", respectively, with design-related and production-related tolerance and error taken into consideration.

Otherwise, the above-described embodiments and modifications may be combined in any manner deemed suitable.

Obviously, numerous modifications and variations of the present disclosure are possible in light of the above teachings. It is therefore to be understood that within the scope of the appended claims, the present disclosure may be practiced otherwise than as specifically described herein.

What is claimed is:

1. A robot system, comprising:
a robot;
a robot work environment in which the robot is configured to work; and
a robot controller comprising circuitry configured to
store position information indicating a position of each of measured robot postures in the robot work environment,
obtain a measured position of each of the measured robot postures based on a detection result obtained by a sensor, and
correct a movement position of the robot based on the measured position,
wherein
the circuitry of the robot controller is configured to set a plurality of corrected coordinate systems that is based on respective work origins, each of the corrected coordinate systems being set based on a transformation combination of a shear transformation and a translation.

2. The robot system according to claim 1, wherein the circuitry of the robot controller comprises a user frame storage configured to store each of the measured robot postures as the work origins, and the circuitry of the robot controller is configured to correct, based on the measured position, position information of each of the work origins stored in the user frame storage.

3. The robot system according to claim 2, wherein the circuitry of the robot controller comprises a movement program storage configured to store a movement command program of the robot, and the movement command program includes relative position information indicating a relative position relative to each of the work origins.

4. The robot system according to claim 3, wherein the relative position information is set within a predetermined range around each of the work origins.

5. The robot system according to claim 3, wherein the circuitry of the robot controller is configured to apply the relative position information to each of the corrected coordinate systems.

6. The robot system according to claim 5, wherein the robot comprises a multi-articular robot.

7. The robot system according to claim 6, wherein each of the corrected coordinate systems is set based on a transformation that is based on measured positions, obtained by the circuitry of the robot controller, of one work origin and two reference points around the one work origin.

8. The robot system according to claim 2, further comprising:
a sensor comprising a camera movable together with the robot, and the circuitry of the robot controller is configured to recognize an image picked up by the camera to obtain the measured position.

9. The robot system according to claim 2, further comprising:
a plurality of work target instruments positioned in the robot work environment such that the robot works on the plurality of work target instruments,
wherein one work origin among the work origins is disposed in each of the work target instruments, or a plurality of work origins among the work origins is disposed at predetermined intervals in each of the work target instruments.

10. The robot system according to claim 9, wherein each of the work target instruments comprises a pipette positioned such that the robot uses the pipette to perform a dispensation operation.

11. The robot system according to claim 9, wherein each of the work target instruments comprises a tube rack comprising an insertion hole into which a tube is inserted, and each of the work origins is set substantially at a center of the insertion hole.

12. A robot controller, comprising:
a user frame storage configured to store a plurality of work origins in a robot work environment in which a robot is configured to work; and
circuitry configured to obtain a measured position of each of the work origins based on a detection result obtained by a sensor, and correct, based on the measured position, position information of each of the work origins stored in the user frame storage, wherein
the circuitry is configured to set a plurality of corrected coordinate systems that is based on the respective work origins, each of the corrected coordinate systems being set based on a transformation combination of a shear transformation and a translation.

13. A method for controlling a robot, comprising:
storing position information indicating, for a robot controller, a position of each of measured robot postures in a robot work environment in which a robot is configured to work;
obtaining a measured position of each of the measured robot postures based on a detection result obtained by a sensor;
correcting the position information of each of the measured robot postures based on the measured position; and
setting a plurality of corrected coordinate systems that is based on respective work origins, each of the corrected coordinate systems being set based on a transformation combination of a shear transformation and a translation.

14. The robot system according to claim 1, wherein the circuitry of the robot controller is configured to apply relative position information to each of the corrected coordinate systems.

15. The robot system according to claim 1, wherein the robot comprises a multi-articular robot.

16. The robot system according to claim 15, wherein each of the corrected coordinate systems is set based on a transformation that is based on measured positions, obtained by the circuitry of the robot controller, of one work origin and two reference points around the one work origin.

17. The robot system according to claim 3, further comprising:
a sensor comprising a camera movable together with the robot, and the circuitry of the robot controller is configured to recognize an image picked up by the camera to obtain the measured position.

18. The robot system according to claim 4, further comprising:
a sensor comprising a camera movable together with the robot, and the circuitry of the robot controller is configured to recognize an image picked up by the camera to obtain the measured position.

19. The robot system according to claim 5, further comprising:
a sensor comprising a camera movable together with the robot, and the circuitry of the robot controller is configured to recognize an image picked up by the camera to obtain the measured position.

20. The robot system according to claim 6, further comprising:
a sensor comprising a camera movable together with the robot, and the circuitry of the robot controller is configured to recognize an image picked up by the camera to obtain the measured position.

* * * * *